T. KEENAN.
PLUG VALVE.
APPLICATION FILED SEPT. 29, 1909.

968,362.

Patented Aug. 23, 1910.

Witnesses:
William Miller
Christian Almstaedt

Inventor
Thomas Keenan
By his Attorneys

UNITED STATES PATENT OFFICE.

THOMAS KEENAN, OF BROOKLYN, NEW YORK, ASSIGNOR TO KEENAN REGULATOR AND STEAM FITTING CO., OF NEW YORK, N. Y., A COPARTNERSHIP.

PLUG-VALVE.

968,362.  Specification of Letters Patent.   Patented Aug. 23, 1910.

Application filed September 29, 1909. Serial No. 520,094.

*To all whom it may concern:*

Be it known that I, THOMAS KEENAN, a citizen of the United States, residing at Brooklyn, in the county of Kings and State of New York, have invented new and useful Improvements in Plug-Valves, of which the following is a specification.

This invention relates to a plug valve which can be used in various manners such as on feed water regulators, for flushing tanks, steam traps or elsewhere.

This invention resides in certain novel details of construction set forth in the following specification and claims and illustrated in the annexed drawing in which:—

Figure 1:
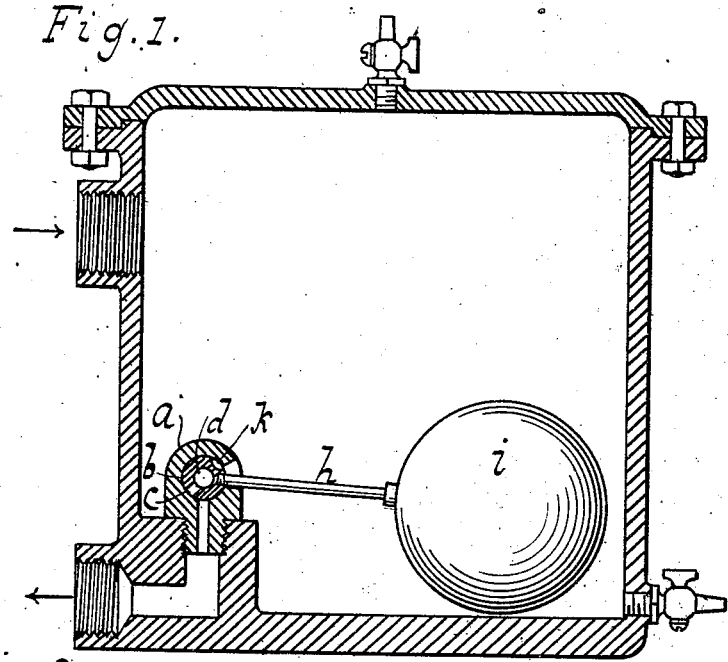
Figure 2:
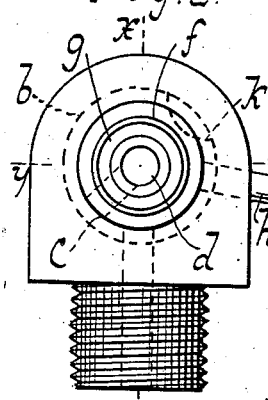
Figure 3:
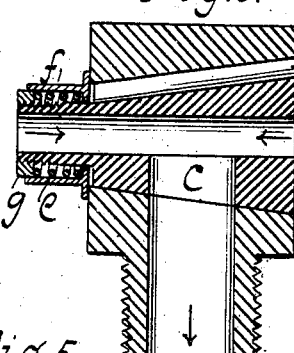
Figure 4:
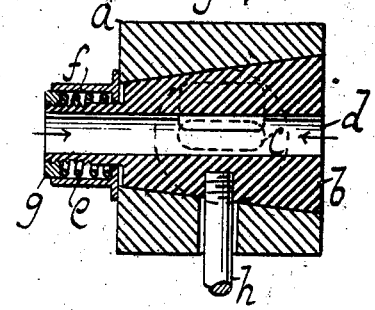
Figure 5:
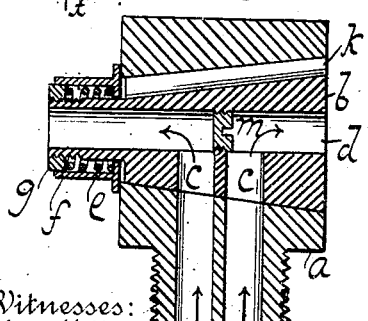
Figure 6:
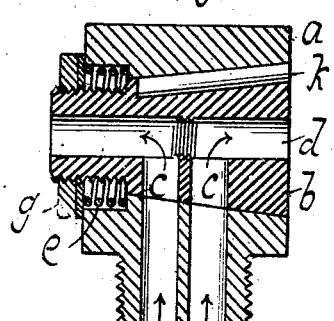

Figure 1 shows an elevation in section of a plug valve embodying this invention and applied to a steam trap. Fig. 2 shows a plug valve on somewhat larger scale than in Fig. 1. Fig. 3 is a section along the line $x-x$ Fig. 2. Fig. 4 is a section along the line $y-y$ Fig. 2. Fig. 5 shows a plug valve embodying this invention and provided with a partition. Fig. 6 is a view like Fig. 5 the partition having been removed.

In this drawing is shown a case or housing $a$ having a tapered seat for neat seating or reception of the correspondingly tapered plug $b$. This plug has a passage $c$ which can serve as an inlet and which can be of more or less extended or longitudinal capacity to allow free passage therethrough into or from the plug valve. If passage $c$ serves as an inlet the liquid or vapor passing therethrough can escape laterally at each side through the axial or central passage or bore $d$. A coil spring $e$ is shown seated about the projecting end of plug $b$ which is threaded for the application of a nut or screw ring $g$. About the spring $e$ is seated a housing or shell $f$ to protect the spring against the entry of dust or foreign matter. The spring $e$ being pressed by nut $g$ against the housing $f$ will tend to draw the plug $b$ home to its seat. The shell $f$ will prevent dirt or foreign matter from lodging on the springs. The plug $b$ can be rotated or oscillated by suitable means as for example by arm $h$ provided with a float $i$.

The plug $b$ has a recess or cut $k$ for receiving balancing pressure if required to prevent the plug being pressed unduly against a side of the housing. The flow through the valve plug can take place either through the axial or longitudinal passage $d$ extended through the plug in axial direction. In this case the radial passage $c$ would serve as an outlet from the valve plug. Or the flow could be allowed to take place through the radial passage $c$ and out at either side through the axial passage $d$. If coming from different sources materials, as for example steam and water entering by the circumferential openings $c$, can be kept separated in the plug by a partition $m$ suitably screwed into the axial bore in the plug. If the partition is removed the materials are allowed to mix in the plug. In Fig. 6 the spring $e$ is shown seated in a recess of casing $a$ and the housing $f$ omitted.

I claim:—

1. A device of the kind described comprising a tapered plug and a housing with correspondingly tapered seat, the plug having a passage extended radially through the circumference of the plug and an axial passage through the plug connecting with the radial passage, said plug having a spring at its pointed end portion to draw the plug to its seat, a nut screwed to the plug to compress the spring and a shell seated about the spring to protect the same.

2. A device of the kind described comprising a tapered plug and a housing with correspondingly tapered seat, the plug having a passage extended radially through the circumference of the plug and an axial passage through the plug connecting with the radial passage, said plug being adapted for seating a partition for the separation of substances coming from different sources through the radial passages.

3. A device of the kind described comprising a tapered plug and a housing with correspondingly tapered seat, the plug having a passage extended radially through the circumference of the plug and an axial passage through the plug connecting with the radial passage, said plug having a recess to allow balancing pressure between the plug and the housing.

In testimony whereof I have hereunto set my hand in the presence of two subscribing witnesses.

THOMAS KEENAN.

Witnesses:
W. C. HAUFF,
CHRISTIAN ALMSTAEDT.